United States Patent
Sheidler et al.

(10) Patent No.: US 8,626,400 B2
(45) Date of Patent: Jan. 7, 2014

(54) GRAIN CLEANING SYSTEM

(75) Inventors: Alan D. Sheidler, Moline, IL (US);
James W. Musser, Charlotte, NC (US);
Peter Finamore, Matthews, NC (US);
Joseph A. Teijido, East Moline, IL (US)

(73) Assignee: Deere & Company, Moline, IL (US)

( * ) Notice: Subject to any disclaimer, the term of this patent is extended or adjusted under 35 U.S.C. 154(b) by 739 days.

(21) Appl. No.: 12/128,886

(22) Filed: May 29, 2008

(65) Prior Publication Data
US 2009/0299564 A1 Dec. 3, 2009

(51) Int. Cl.
*A01D 90/00* (2006.01)

(52) U.S. Cl.
USPC ............. 701/50; 460/1; 56/1; 56/10.2 R

(58) Field of Classification Search
USPC ......... 701/36, 50, 99; 180/53.1; 56/1, 10.2 R, 56/10.2 A–10.2 H, 11.1, 11.2, 11.9, 10.6, 56/10.7; 460/1, 59, 79, 97
See application file for complete search history.

(56) References Cited

U.S. PATENT DOCUMENTS

| | | | | |
|---|---|---|---|---|
| 4,035,993 | A | * | 7/1977 | Bell et al. ............. 56/13.1 |
| 4,250,897 | A | | 2/1981 | Glaser |
| 4,253,471 | A | | 3/1981 | Klimmer |
| 4,265,077 | A | | 5/1981 | Peters |
| 4,347,907 | A | * | 9/1982 | Downing, Jr. ........... 180/65.1 |
| 4,376,298 | A | * | 3/1983 | Sokol et al. ............ 701/34 |
| 4,422,462 | A | * | 12/1983 | Decoene ............... 460/98 |
| 4,531,528 | A | | 7/1985 | Peters et al. |
| 4,587,799 | A | | 5/1986 | Thomas et al. |
| 4,614,197 | A | | 9/1986 | Weber et al. |
| 4,663,921 | A | | 5/1987 | Hagstrom et al. |
| 4,821,744 | A | | 4/1989 | Turner et al. |
| 4,968,285 | A | | 11/1990 | Schuhmacher |
| 5,106,339 | A | * | 4/1992 | Braun et al. ............ 460/7 |
| 5,387,154 | A | | 2/1995 | Peters |
| 6,119,442 | A | * | 9/2000 | Hale ................. 56/10.2 H |
| 6,585,584 | B2 | | 7/2003 | Buermann |
| 6,773,343 | B2 | | 8/2004 | Grywacheski et al. |
| 6,817,551 | B2 | * | 11/2004 | Williams et al. ......... 239/656 |
| 6,921,330 | B2 | | 7/2005 | Grywacheski et al. |
| 7,074,126 | B2 | | 7/2006 | Weichholdt et al. |
| 2005/0020331 | A1 | | 1/2005 | Sahr et al. |
| 2005/0282601 | A1 | * | 12/2005 | Duquesne et al. ........ 460/101 |

FOREIGN PATENT DOCUMENTS

EP 1 712 122 A1 10/2006
GB 1 158 071 7/1969

* cited by examiner

*Primary Examiner* — Thomas Tarcza
*Assistant Examiner* — Adam Tissot
(74) *Attorney, Agent, or Firm* — Yee & Associates P.C.

(57) ABSTRACT

A method for powering a system in a vehicle, the method including the steps of mechanically coupling, driving and controlling. The mechanically coupling step includes coupling a power unit with at least one primary load, the at least one primary load including a propulsion load. The driving step includes driving a cleaning fan and a cleaning shoe with at least one power source, the at least one power source being mechanically independent from the power unit. The controlling step includes controlling a speed of the at least one power source independent of a speed of the power unit.

20 Claims, 4 Drawing Sheets

GRAIN CLEANING SYSTEM

FIELD OF THE INVENTION

The present invention relates to vehicles powered by engines and more particularly to a grain cleaning assembly associated with a harvesting vehicle.

BACKGROUND OF THE INVENTION

A grain-harvesting combine includes a header, which cuts the crop and feeds it into a threshing rotor. The threshing rotor rotates within a perforated housing, performing a threshing operation of the grain from the crop directed thereinto. Once the grain is threshed it falls through perforations in the housing onto a grain pan. From the grain pan the grain falls through a set of upper and lower sieves that are known as a cleaning shoe. The sieves are vibrating or oscillating, causing clean grain to fall through for the purposes of collection. A cleaning fan blows air through the sieves, discharging chaff toward the rear of the combine. Crop residue such as straw from the threshing section proceeds through a straw chopper and out the rear of the combine.

In a combine some of the chaff and straw is mixed with grain after the threshing operation. The cleaning assembly removes these contaminants from the grain. In most harvesting machines the cleaning assembly includes the blower, an upper sieve and a lower sieve. The blower has its own housing, whereas the upper sieve and lower sieve are part of a cleaning shoe.

What is needed in the art is an efficient and effective way of controlling the cleaning shoe and cleaning fan speeds.

SUMMARY OF THE INVENTION

The present invention provides an effective way to control the speeds of the cleaning system in a harvesting machine.

The invention in one form is directed to a method for powering a system in a vehicle, the method including the steps of mechanically coupling, driving and controlling. The mechanically coupling step includes coupling a power unit with at least one primary load, the at least one primary load including a propulsion load. The driving step includes driving a cleaning fan and a cleaning shoe with at least one power source, the at least one power source being mechanically independent from the power unit. The controlling step includes controlling a speed of the at least one power source independent of a speed of the power unit.

The invention in another form is directed to a vehicle including a power unit, a cleaning fan, a cleaning shoe, a frame and at least one power source. The power unit is couplable with at least one primary load, the at least one primary load including a propulsion load. The frame provides support for the cleaning fan and the cleaning shoe. The at least one power source is drivingly coupled to the cleaning fan and/or the cleaning shoe. The at least one power source is mechanically independent from the power unit. The at least one power source is independent from the propulsion load.

DETAILED DESCRIPTION OF THE INVENTION

One of the limiting factors of a combine's productivity is performance of the cleaning shoe. Typical combines have a cleaning shoe and a cleaning fan drive that is operated at a fixed ratio to the engine speed. If the engine speed varies, the fan and cleaning shoe speed vary by precisely the same percentage as the variation of the engine speed. For example the shoe shape frequency may be selected to be 300 rpm when the engine speed is 2200 rpm. The fan speed ratio is variable by the operator over a range, but once the fan speed ratio is set the rpm of the fan is dependent upon the engine rpm.

The rated operating speed of an engine is typically 2200 rpm, which is the normal speed where the engine develops the full rated power. The full range of the operating engine speed is typically 2000 rpm to 2340 rpm. This represents a range of +6%/−9% in cleaning shoe speed. In many conditions, if the fan speed and shoe shake frequency vary by this amount, it can result in high losses, dirty grain in the tank and even premature shoe frame failure. In harvesting very light grains, like grass seed, if the fan speed increases even slightly, the light grain can be blown out and lost. Further, engine speed variations can occur when the machine varies in its angular attitude relative the ground, such as when traveling up a hill, going down a hill or even when the harvester is turning around at the end of the field. Further, power may drop suddenly or threshing power may drop because the machine is no longer cutting grain, but some of the harvested crop is still passing through the harvesting machine.

Figure 1:
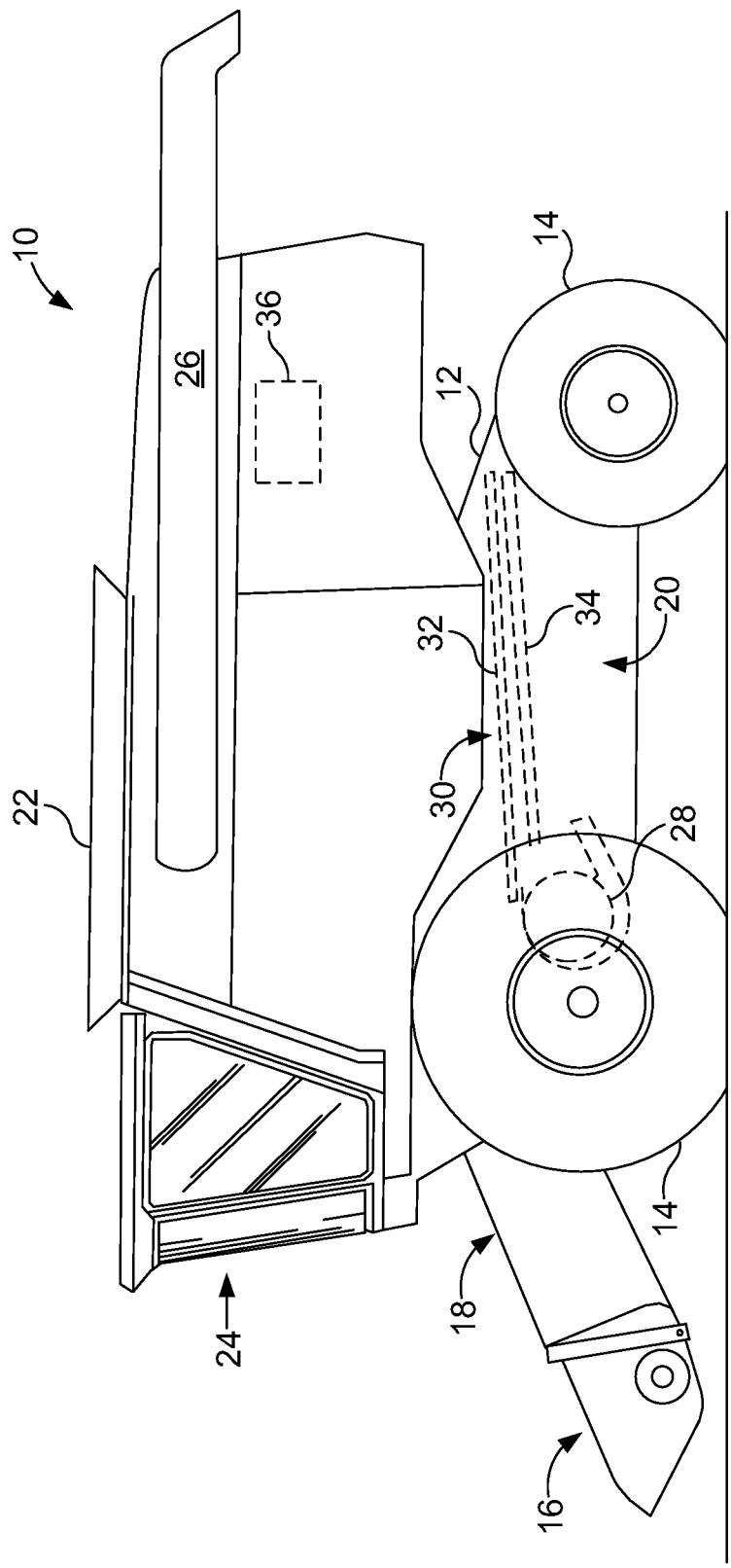
FIG. 1 is a side view of an agricultural vehicle in the form of a harvester that includes an embodiment of a cleaning system control of the present invention.
Figure 2:
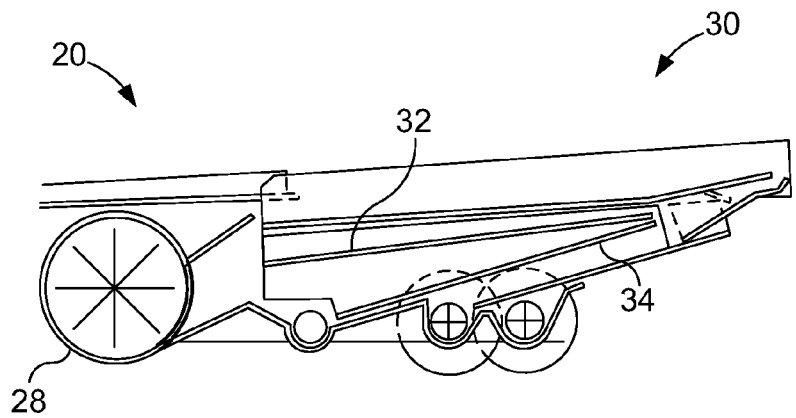
FIG. 2 is a schematical side view of a grain cleaning assembly utilized in the harvester of FIG. 1.
Figure 3:
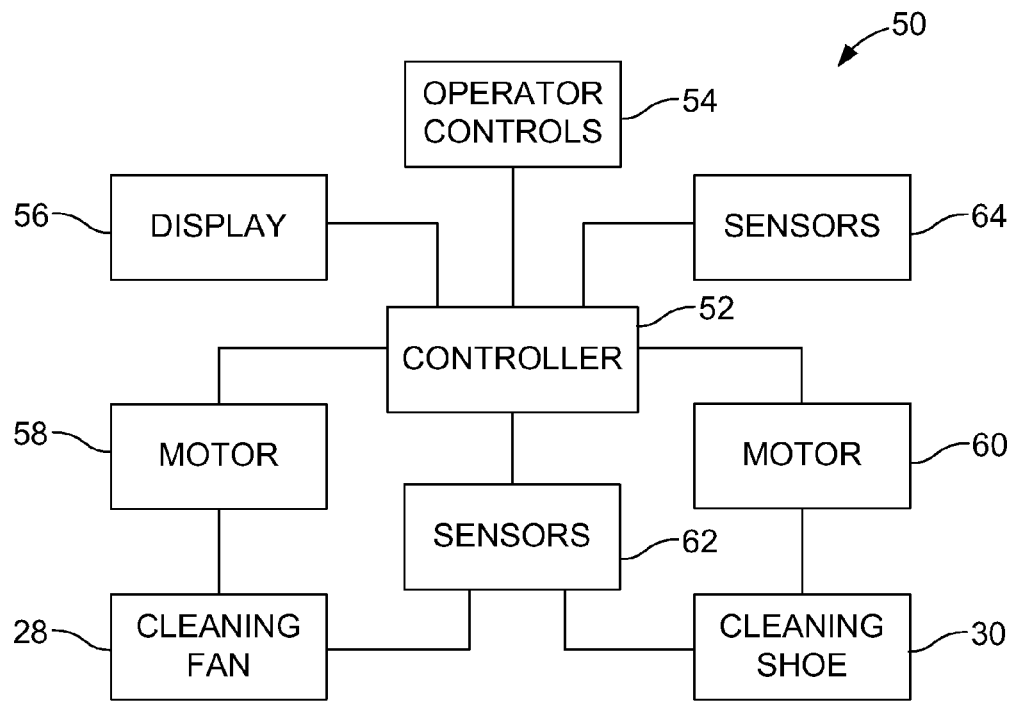
FIG. 3 is a schematical block diagram of elements utilized in an embodiment of the present invention installed in the harvester of FIG. 1.

Referring now to the drawings, and more particularly to FIGS. 1-3, there is shown a powered mechanism such as a working vehicle in the form of an agricultural harvesting machine, such as an agricultural combine 10. The powered mechanism can have more than one power unit, such as an engine. The powered mechanism may include a propulsion system to move the powered mechanism from place to place. The working vehicle can also be in the form of a different type of vehicle using a grain cleaning system of the present invention.

Agricultural vehicle 10 includes a frame 12 with wheels 14. Frame 12 provides support for the various elements of agricultural vehicle 10. Agricultural vehicle 10 uses a power unit 36, in the form of an internal combustion engine to drive the propulsion system including wheels 14. The propulsion system places a propulsion load on the power unit, in the form of a direct mechanical load.

There is attached to frame 12 a cutting mechanism 16, a feeder house 18, a cleaning assembly 20, a grain tank 22, an operator cab 24 and a grain auger 26. Cutting mechanism 16 extends forward from combine 10 and serves to feed the harvested product into feeder housing 18. Feeder housing 18 guides the harvested product to a threshing section, a separation section and a cleaning assembly 20, which are arranged within harvester 10. Engine 36 powers agricultural vehicle 10, which may be in the form of an internal combustion engine and may be referred to as a primary power source 36. For ease of understanding engine 36 is referred to in the singular herein, although it is also contemplated that agricultural vehicle 10 may have more than one engine.

Feeder housing 18 guides the harvested product into a threshing section and from there into a separating assembly, not illustrated, and the grain and chaff are then fed to cleaning assembly 20. The threshing section may be driven by the engine, which may be the same power unit that provides propulsion power. After the grain is cleaned in cleaning assembly 20 the clean grain is transferred to grain tank 22 and the chaff and straw are fed out the rear of combine 10. Clean grain is temporarily stored in grain tank 22 and is unloaded by an operator by way of controls contained in operator cab 24. Operator controls contained in cab 24 allows for the grain to be transferred from grain tank 22 by way of grain auger 26 to a transporting vehicle, not shown.

Cleaning assembly 20 includes cleaning fan 28 and a cleaning shoe 30. Cleaning shoe 30 includes an upper sieve 32 and a lower sieve 34. Sieves 32 and 34 are moved at a selected frequency to allow for the effective separation of the grain from the crop residue. Cleaning fan 28, as illustrated in FIG. 3, is driven by a motor 58 and cleaning shoe 30 is driven by a motor 60. Motors 58 and 60 are power sources for cleaning fan 28 and cleaning shoe 30. Motors 58 and 60 are mechanically independent from the primary power unit. Although depicted as two separate motors 58 and 60, it is also contemplated that one separately driven power source may be configured to drive both cleaning fan 28 and cleaning shoe 30. Whether one motor, or more, are utilized each of the motors are independent power sources that a controller 52 controls and which operate at speeds that are independent of the engine speed of the power unit of agricultural vehicle 10. Cleaning shoe 30 is controlled to operate at a selected speed, which may be between 200 and 400 rpm, and particularly between 250 and 350 rpm. The use of the word "independent" is used to define that motors 58 and 60 are not directly mechanically driven by engine 36 of agricultural vehicle 10.

Controller 52 is part of cleaning control system 50 which is communicatively and operatively connected to operator controls 54, a display 56, motors 58 and 60, and sensors 62 and 64. It can be appreciated that controller 52 may be embodied as firmware or software in a controller that is utilized to control other aspects of agricultural vehicle 10, as a microprocessor system or as separate electronic circuits dedicated to the control of the grain cleaning system. Operator controls 54 and display 56 are located within operator cab 24 allowing the operator to effectively control the operating speeds of cleaning fan 28 and cleaning shoe 30. Display 56 provides the operator information relative to the operating conditions of cleaning fan 28 and cleaning shoe 30 by way of sensors 62. The operating conditions, such as the speed of cleaning fan 28 and cleaning shoe 30, are conveyed from sensors 62 to controller 52 to display 56, for the display of the information on display 56.

The operator can adjust conditions of cleaning fan 28 and cleaning shoe 30, such as the speed thereof, by way of inputting information on operator controls 54. The operator may control the speeds of cleaning fan 28 and cleaning shoe 30 based on the type of crop, which is being harvested by agricultural vehicle 10. Sensors 62 may detect not only speed, but other elements and conditions, such as vibration frequencies of cleaning fan 28 and cleaning shoe 30, which may indicate bearing degradation or an imbalanced load. The effective control of the speed of cleaning fan 28 and the speed of cleaning shoe 30 ensures effective efficient harvesting of the grain while maintaining superior quality of the grain process through cleaning assembly 20.

Sensors 64 may sense various attributes of not only cleaning system 20 but other environmental and performance aspects of agricultural vehicle 10. Even though sensors 64 are depicted as sensors associated with cleaning control system 50 the sensors may be a part of other systems of vehicle 10 and the information is communicated to cleaning control system 50. The items sensed included grain damage, grain loss, humidity of the air, barometric pressure, temperature of the air, angular attitude of agricultural vehicle 10 and grain moisture. These and other elements are important to the altering of the speed of cleaning fan 28 and/or cleaning shoe 30. Feedback of the sensed elements may be automatically controlled by controller 52 upon criteria contained therein, or by way of information input by the operator, by way of operator controls 54.

The amount and type of grain damage may be detected by one of sensors 64 so that the damage that is occurring can be compensated for by cleaning assembly 20 to reduce the loss of the grain or the information is passed on, by way of controller 52, so that other elements effecting the grain damage may be adjusted prior to the grain reaching cleaning system 20. A grain loss sensor 64 detects grain that is being moved beyond cleaning system assembly 20, which would indicate that some element of cleaning system 20 may need to be changed, such as the speed of cleaning fan 28 and/or the speed of operation of cleaning shoe 30. The humidity of the air can influence the density of the air, which can affect the speed at which cleaning fan 28 and/or cleaning shoe 30 may effectively operate. Again, criteria obtained within controller 52 can be utilized to alter the speed of either cleaning fan 28 or cleaning shoe 30 based upon the density of the air which may be reflected partially by the humidity of the air.

The barometric pressure indication will provide information relative to the amount of air being moved through cleaning system 20 so that the speed of cleaning fan 28 and/or cleaning shoe 30 may be altered based thereon. A temperature sensor may detect the temperature of the air and/or the temperature of the grain in order to effectively control the speed of cleaning fan 28 and/or cleaning shoe 30 dependent upon the measured temperatures. The angular attitude of agricultural vehicle 10 alters the angles of sieves 32 and 34, which can change the performance thereof. So the information from an angular attitude sensor 64 can be used by controller 52 to thereby alter the speeds of cleaning fan 28 and/or cleaning shoe 30 dependent upon the attitude of agricultural vehicle 10. Grain moisture may influence the seperability and size of the harvested grain causing it to behave differently within cleaning system 20, which can then be altered to optimize the recovery of the grain in cleaning system 20 by the adjusting of the speed of cleaning fan 28 and/or cleaning shoe 30.

Cleaning control system 50 operates cleaning fan 28 and cleaning shoe 30 independent of engine speed for a load on the engine to thereby reduce variability within cleaning system 20. Motors 58 and 60 have shafts that turn at selected speeds under the control of controller 52 and each of which may have a substantially constant shaft speed independent of the speed of a shaft of engine 36 and of each other. There being no mechanical linkage directly from a moving portion of engine 36 to cleaning fan 28 and cleaning shoe 30 thereby allowing cleaning control system 50 to operate independent of the speed of engine 36. This advantageously allows for optimum performance of cleaning system 20 regardless of engine speed. The speed of cleaning fan 28 and/or cleaning shoe 30 may be set to operate at a default speed unless another speed is input by the operator by way of operator controls 54. Further, the information received from sensors 62 and 64 can be utilized by controller 52 to automatically compensate the speeds of cleaning fan 28 and cleaning shoe 30 for optimal performance of cleaning assembly 20. Controller 52 can switch the direction of motors 58 and 60 in order to move grain off of cleaning shoe 30 for the purpose of starting agricultural vehicle 10, for example if grain was left on cleaning shoe 30 when agricultural vehicle 10 was powered down.

The present invention eliminates the prior art mechanical drive, which is connected directly to the engine output through a series of belts, chains, pulleys, cranks and/or gears. Motors 58 and 60 are independently driven and may be electrical in nature and may controlled by a controller 52 even if motors 58 and 60 are driven in some other manner, such as hydraulically or pneumatically. The information displayed on display 56, for the operator may include the outputs from sensors 62 and 64 or selected outputs therefrom.

Engine 36 of agricultural vehicle 10 may include a separate generator that provides power for cleaning control system 50. This separate generator may be disengaged from the engine during startup times or other selected operation scenarios of agricultural vehicle 10, which may part of a load shedding regime. For example, the cleaning shoe may require approximately 6 kilowatts of power during operation, however very high loads could be experienced when the machine is shut off with grain left on cleaning shoe 30. In prior art systems this problem was solved by over-sizing the drive linkage from the engine to the cleaning shoe. To prevent the over-sizing of the electrical portion the present invention, the machine direction of motors 58 and/or 60 can be independently operated in the directions opposite to those in normal cleaning operations, for example with cleaning shoe 30 being reversed to move grain off of cleaning shoe 30 under less power than prior art systems. Alternatively, cleaning fan 28 may be driven at a high speed to blow grain and/or debris from cleaning shoe 30.

Advantageously the present invention enables a significant improvement in cleaning shoe and cleaning fan effectiveness. The shoe shake frequency and fan speed are controlled to run at optimum settings for maximum throughput, improved clean grain quality, reduction of structural stress due to excessive shake frequency and reduced power consumption. An additional feature is the ability to adjust shoe shake frequency and blower speed for different crops. With the present invention the frequency of the shoe and speed of the fan for different crops can be selected for optimal cleaning. Additionally, a close control on the range of variation of the selected frequency and speed is obtainable by way of the present invention.

Figure 4:
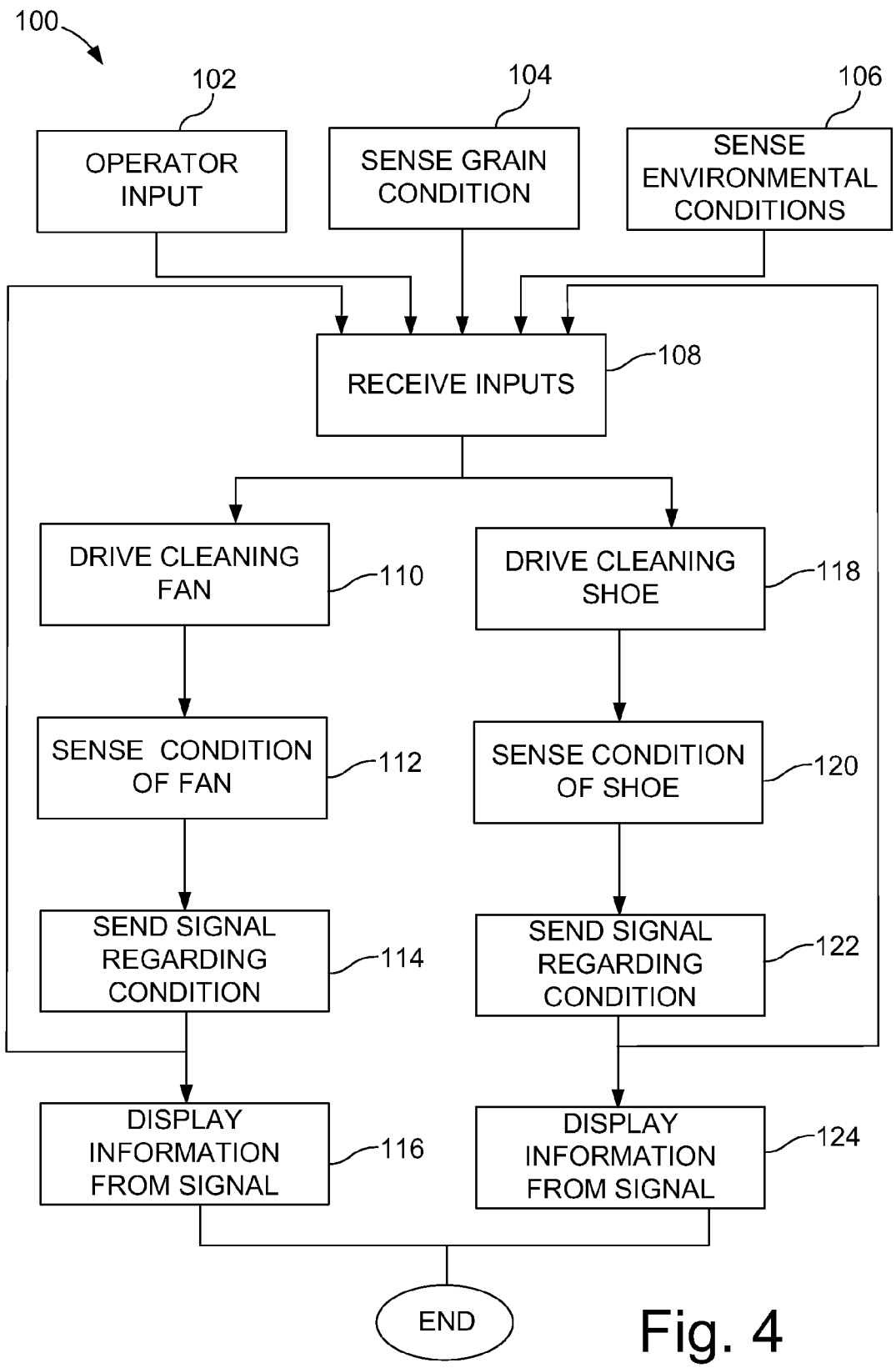
FIG. 4 is a flow chart illustrating an embodiment of a method of the present invention utilized by the elements of FIG. 3.
Figure 5:
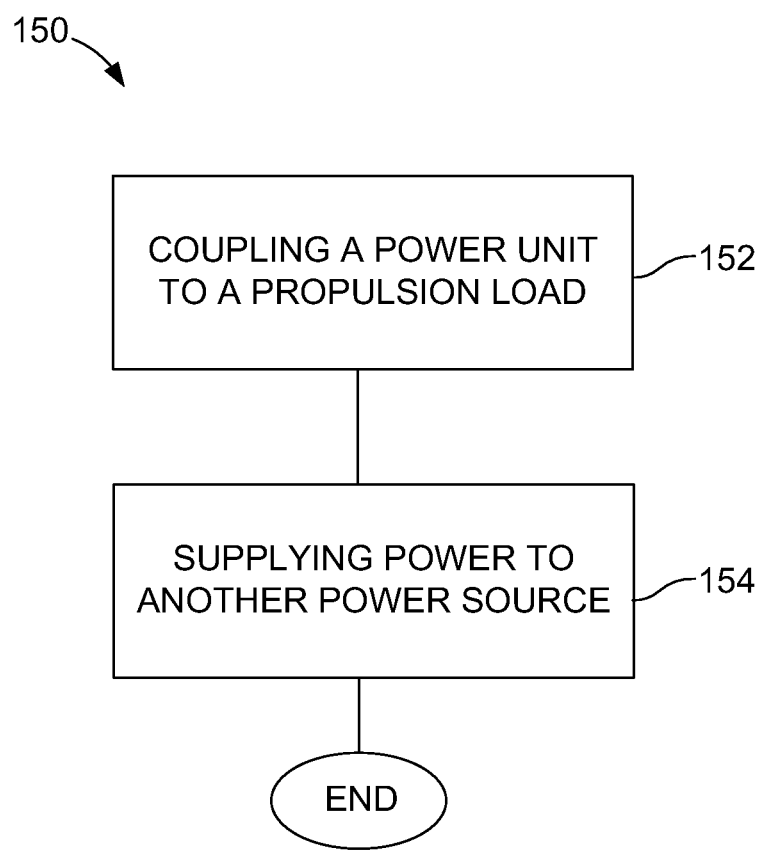
FIG. 5 is a flow chart illustrating functions of the vehicle of FIG. 1.

Now, additionally referring to FIGS. 4 and 5, there is shown a method 100 and a method 150 that operate independently and simultaneously. Method 100 illustrates an embodiment of a method of the present invention for the control of cleaning control system 50. Method 150 illustrates that a power unit of vehicle 10 drives a propulsion load, at step 152, such as a drive train that includes wheels 14. The coupling of a power unit 36 to a propulsion load may be accomplished by way of a clutch system, not illustrated, to thereby drive the propulsion load. The power unit, which may be the engine 36 of vehicle 10 also supplies power to another power source at step 154, the power from this power source being used by motors 58 and 60. However, there is no mechanical coupling between engine 36 and motors 58 and 60 for the driving of motors 58 and 60. It will be appreciated that the particular location and order of execution of the steps may vary depending upon the application and sensor inputs available and deemed applicable to a particular crop.

Method 100 includes operator inputs being sent to system 50 at step 102, the sensing of grain conditions at step 104 and the sensing of environmental conditions at step 106. These steps can occur substantially simultaneously and depending on the application some may not occur with any regularity or even at all. Any of these steps may initiate the method when new inputs are issued that are then received by step 108. At step 102, an input to system 50 is generated by an operator by way of operator controls 54. This can, for example, be for an adjustment of the speed of cleaning fan 28 and/or cleaning shoe 30 based on operator preference or change in the type of crop or perceived operating conditions. At step 104, the condition of the grain is sensed by sensors 64, which may include the moisture of the grain, the volume of the grain going through cleaning assembly 20, the cleanliness of the grain, cracked grain and other measures of the condition of the grain. At step 106, environmental operating conditions are sensed by sensors 64, which may include the humidity of the ambient air, the barometric pressure, the attitude of vehicle 10 and other environmental operating elements related to vehicle 10. Further conditions sensed at step 106 include the detection of a load on engine 36 and on any other mechanism of vehicle 10, which is processed by controller 52, to determine if a change in cleaning system 20 is needed.

At step 108, inputs are received by controller 52 from steps 102, 104, 106, 114 and 122 allowing controller 52 to controllably drive cleaning fan 28 and cleaning shoe 30 at steps 110 and 118, respectively. At steps 112 and 120, operating conditions of cleaning fan 28 and cleaning shoe 30 are respectively sensed. The conditions may include a speed, a vibration or other operating conditions sensed by sensors 62. The information gathered by sensors 62 is conveyed by way of signals at steps 114 and 122 to display 56, at steps 116 and 124, by way of controller 52. The signals sent at steps 114 and 122 also serve as inputs to step 108 and are used to alter the speed of fan 28 and/or shoe 30 dependent upon the information. Method 100 continuously repeats with the elements of cleaning control system 50 functioning without reference to or being dependent upon an engine speed of engine 36.

Controlling the speed of fan 28 and the frequency of shoe 30 is carried out by controller 52 utilizing steps 110, 112 and 114 for the fan and steps 118, 120 and 122 for the shoe. The controlling is dependent upon an input of the operator at step 102, or at step 106 dependent upon information from sensors 64 regarding a load on engine 36 or another mechanism of vehicle 10. A speed of either fan 28 or shoe 30 can be maintained by system 50 based on operator input at step 102 or at a default speed stored in a memory of controller 52. Further, controller 52 can drive fan 28 and/or shoe 30 in a reverse direction at steps 110 or 118.

Having described the preferred embodiment, it will become apparent that various modifications can be made without departing from the scope of the invention as defined in the accompanying claims.

The invention claimed is:

1. A method for powering a system in a vehicle, the method comprising the steps of:
   mechanically coupling a power unit with at least one primary load, said at least one primary load including a propulsion load;
   driving a cleaning fan and a cleaning shoe with at least one power source, said at least one power source being mechanically independent from said power unit;
   controlling a speed of said at least one power source independent of a speed of said power unit;
   sensing at least one of humidity of air, barometric pressure, air temperature, and angular attitude of the vehicle, by way of at least one sensor;

conveying information from said at least one sensor to a controller, said information relating to at least one element sensed in said sensing step; and
independently altering both said speed of said cleaning fan and a frequency of movement of said cleaning shoe dependent upon said information.

2. The method of claim 1, wherein said controlling step is dependent upon at least one of a load on said power unit and a load on at least one other mechanism of the agricultural vehicle.

3. The method of claim 2, wherein said at least one power source has a shaft turning at a substantially constant shaft speed independent of a speed of said power unit.

4. The method of claim 1, wherein said controller is in controlling communication with said at least one power source.

5. The method of claim 4, further comprising the steps of:
sending a first signal from at least one sensor coupled to said cleaning shoe to said controller; and
sending a second signal from at least one sensor coupled to said cleaning fan to said controller, said first signal and second signal respectively containing information about an operating condition of said cleaning shoe and said cleaning fan.

6. The method of claim 5, further comprising the steps of:
displaying information on a display, said information being derived from at least one of said first signal and said second signal relating to a speed of at least one of said cleaning fan and said cleaning shoe; and
receiving an input command from an operator by way of an operator control that is communicatively coupled to said controller, said input command being to change said speed of at least one of said cleaning fan and said cleaning shoe.

7. The method of claim 6, further comprising the step of maintaining said speed of at least one of said cleaning fan and said cleaning shoe at least one of at a default speed and at a speed input by the operator.

8. The method of claim 1, further comprising the step of switching a direction of said at least one power source thereby moving grain off of said cleaning shoe.

9. The method of claim 1, further comprising the step of adjusting a shake frequency of said cleaning shoe by way of said controlling step.

10. A vehicle, comprising:
a power unit being couplable with at least one primary load, said at least one primary load including a propulsion load;
a cleaning fan;
a cleaning shoe;
a frame providing support for said cleaning fan and said cleaning shoe;
at least one power source drivingly coupled to at least one of said cleaning fan and said cleaning shoe, said at least one power source being mechanically independent from said power unit, said at least one power source being independent from said propulsion load;
a controller; and
at least one sensor for sensing at least one of humidity of air, barometric pressure, air temperature, and angular attitude of the vehicle, said at least one sensor communicating information to said controller, said controller configured to independently alter both a speed of said cleaning fan and a frequency of movement of said cleaning shoe dependent upon said information.

11. The vehicle of claim 10, wherein said at least one power source includes an electric motor having a shaft turning at a substantially constant shaft speed independent of a speed of said power unit.

12. The vehicle of claim 11, wherein said shaft is connected to said cleaning shoe, said shaft being driven at between 200 rpm and 400 rpm.

13. The vehicle of claim 10, wherein said controller is controllingly coupled with said at least one power source.

14. The vehicle of claim 13, further comprising:
at least one sensor coupled to said cleaning shoe configured to send a first signal to said controller; and
at least one sensor coupled to said cleaning fan configured to send a second signal to said controller.

15. The vehicle of claim 14, further comprising:
a display communicatively coupled to said controller, said display displaying information derived from at least one of said first signal and said second signal relating to a speed of at least one of said cleaning fan and said cleaning shoe; and
a set of operator controls communicatively coupled to said controller, said set of operator controls configured to relay inputs from the operator to said controller to vary said speed of at least one of said cleaning fan and said cleaning shoe.

16. The vehicle of claim 15, wherein said controller is configured to maintain said speed of at least one of said cleaning fan and said cleaning shoe at least one of at a default speed and at a speed input by the operator.

17. The vehicle of claim 16, further comprising a generator mechanically driven by said power unit, said at least one power source including an electric motor, said generator being electrically connected to said electric motor.

18. The method of claim 1, wherein said sensing step additionally senses grain temperature.

19. The method of claim 1, wherein said sensing step additionally senses grain moisture.

20. The method of claim 1, wherein said information used in said independently altering step includes the angular attitude of the vehicle.

* * * * *